July 14, 1953
S. C. CHESSMAN
2,645,450
FLUID VALVE MEANS
Filed Nov. 26, 1948
2 Sheets-Sheet 1
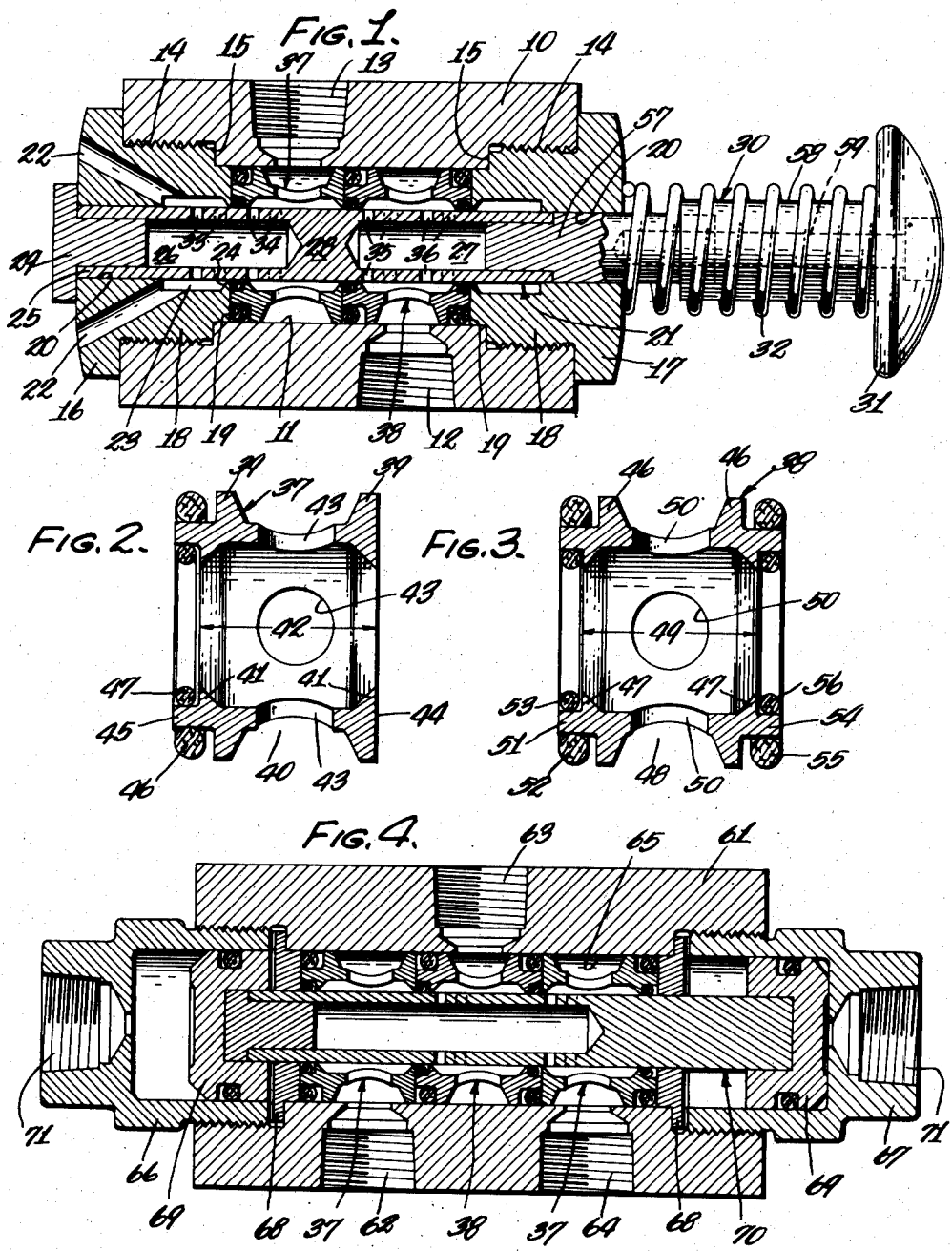
INVENTOR.
SAMUEL C. CHESSMAN
BY
ATTORNEY July 14, 1953
S. C. CHESSMAN
2,645,450
FLUID VALVE MEANS
Filed Nov. 26, 1948
2 Sheets-Sheet 2
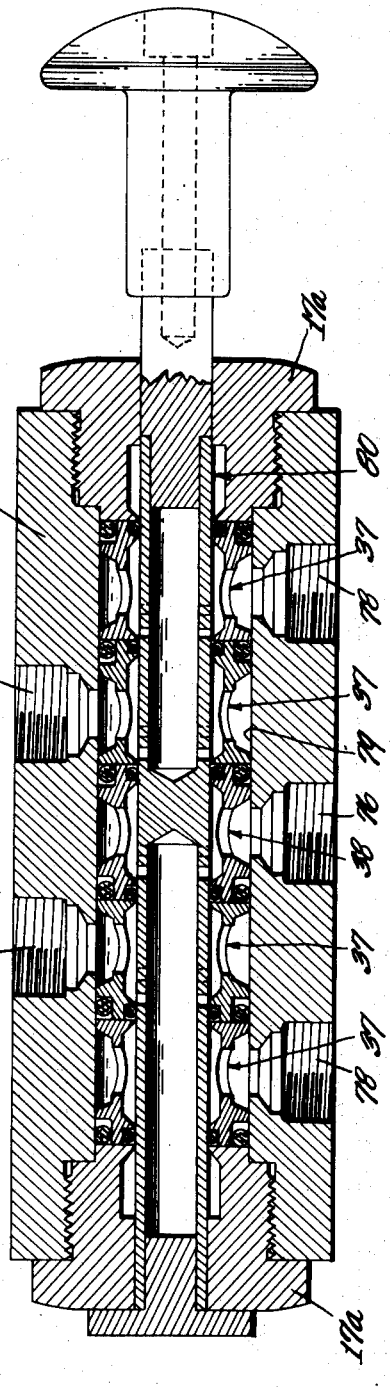
INVENTOR.
SAMUEL C. CHESSMAN
BY
ATTORNEY Patented July 14, 1953

2,645,450

UNITED STATES PATENT OFFICE 2,645,450

FLUID VALVE MEANS

Samuel C. Chessman, Salem, Ohio, assignor to C. B. Hunt & Son, Inc., Salem, Ohio, a corporation of Ohio Application November 26, 1948, Serial No. 62,013

7 Claims. (Cl. 251—76)

My invention relates to fluid valve means, and the principal object of my invention is to provide new and improved valve means.

In present day design, numerous fluid systems require control valves of special design to accomplish specific functions. In such cases, it has heretofore been the practice to manufacture special valves in individual or small amount lots, but this is expensive, as will be appreciated, since mass production methods cannot be used. Further, even in the manufacture of standard valves of prior construction, considerable expense was involved in the manufacture and assembly of the valve, since the design of such valves did not permit mass production manufacture and assembly.

My invention makes it possible to manufacture both standard and special valves on a mass production basis, thus increasing uniformity of operation and decreasing manufacturing costs. My invention provides easily assembleable, replaceable and interchangeable valve parts, certain of which carry their own sealing means and which may be assembled in any one of a number of relations.

In the drawing accompanying this specification and forming a part of this application, there is shown, for purpose of illustration, an embodiment which my invention may assume, and in these drawings:

Figure 1 is a longitudinal section through a valve showing an embodiment of my invention, Figures 2 and 3 are enlarged sectional views of parts used in the construction shown in Figure 1, Figures 4 and 5 are longitudinal sectional views through valves of different types, showing the embodiment of my invention, and Figure 6 is an elevational view of a still different type of valve.

The valve shown in Figure 1 is a normally closed, manually operable, three-way fluid valve with open exhaust, and comprises a valve body 10 having an axial valve bore 11. The body 10 has an inlet opening 12 and an outlet opening 13, both adapted to communicate with the bore 11. Each extremity of the bore 11 is enlarged and threaded, as shown at 14, the enlargements forming shoulders 15 which are positioned in predetermined relation with respect to the inlet and outlet openings 12, 13. Plugs 16 and 17 close respective ends of the bore 11, each plug having a screw-threaded portion 18 threaded into the enlargements 14, and also having a reduced portion forming a shoulder abutting a respective shoulder 15, and a plano-extremity 19 extending into the bore proper a predetermined amount for a purpose hereinafter to be described.

Each of the plugs 16 and 17 has a central opening 20, providing a bearing for an axially movable plunger 21, the exterior surface of the plunger being spaced from the surface of the bore 11. The plugs 16 and 17 are generally similar in over-all construction, so that they may be mass-produced. The plug 16 additionally has a series of inclined exhaust apertures 22 positioned about the central opening 20, each aperture establishing fluid communication between the atmosphere and a chamber 23 formed in the plug 16. The chamber 23 is terminated at the inner extremity of the plug by means of a tapered annular wall 24 adjoining the plano-extremity 19.

The plunger 21 comprises a cylindrical body 25 having openings 26 and 27 extending inwardly from opposite ends, but stopping short of each other to provide the dividing wall 28. A plug 29, securely fixed in position, closes the end of opening 26, and an operating handle 30, secured in position to close the end of the opening 27, extends outwardly of the body 10 and terminates in an enlarged head 31. A coil spring 32 is interposed between the head 31 and the adjacent end of the body, to urge the plunger 21 to the right, as viewed in Figure 1, a distance defined by abutment of the plug 29 with the opposite end of the body 10. The plunger, at the opening 26, has spaced apart sets of openings 33 and 34, and at the opening 27 has spaced-apart sets of openings 35 and 36, for a purpose later to appear.

Separator means are radially interposed between the plunger 21 and the adjacent surface, and in the valve construction shown in Figure 1, such separator means comprise a pair of members 37 and 38, best seen in Figures 2 and 3. The separator member 37 comprises a sleeve-like body having a pair of exterior annular ribs 39, facing surfaces of which are inclined toward each other to form an annular space 40 adapted to communicate with either the inlet or outlet opening, and in the construction herein shown, this member communicates with the outlet opening 13. The separator member 37 also has a pair of internal annular ribs 41 which taper inwardly to a feathered edge so as to somewhat accurately define a space 42 therebetween. Intermediate the ribs 39—39 and 41—41, the sleeve-like body is formed with a series of apertures 43 which are adapted to establish communication between the spaces 40 and 42.

One end of the separator member 37 is formed with a planosurface 44, and the opposite end is formed with an axially extending annular rib 45 which forms external and internal annular recesses with the adjoining ribs 39 and 41 for the reception of sealing members 46 and 47 respectively. The sealing members may be of any suitable construction, and in the construction disclosed it has been found desirable to use commercially available O-ring packings.

The separator member 38 is somewhat similar to the member 37, in that it has external ribs 46—46, internal ribs 47—47 respectively similar to the ribs 39—39 and 41—41. Thus, external and internal spaces 48 and 49 are formed, and although the external space 48 may vary slightly in size as compared to the space 40, it is to be noted that the length of the space 49 is substantially equal to the length of the space 42. The member 38 has apertures 50 establishing communication between the spaces 48, 49, and also has an axially extending annular rib 51 which provides recesses for the sealing members 52, 53. Instead of a planosurface at the opposite end of member 38, an axially extending rib 54 is provided at this end, this rib being similar to the rib 51, thus providing recesses for sealing members 55, 56. Because of the ribs 51, 54, the member 38 is greater in axial length as compared with the length of the member 37.

The separator members are assembled with the other parts of the valve construction at a time when only one of the plugs 16, 17 has been threaded to proper position.

In the construction shown, the operating handle 30 comprises a plug 57 which is securely fixed in the opening 27 and which is received within a recess formed in a boss 58 extending from the head 31. A bolt 59 is used to secure the head 31 to the plug 57. Accordingly, it is preferable, although not essential, that the plug 16 is threaded into the body 10 to position predetermined by abutment with the shoulder 15 before assembly of the separator members and the plug 17.

The separator members may then be inserted through the open end of the bore 11 opposite the plug 16 and slid axially of such bore, so that the first inserted member bears against the planosurface 19 of the plug 16 and the other member abuts the first inserted member. The other plug 17 may then be threaded to position wherein its surface 19 abuts the adjoining separator member, and the plunger may be inserted from the left hand side (Figure 1) of the body and the spring 32 and head assembled by means of the bolt 59.

In Figure 1, the separator member 37 was first inserted, so that its rib 45 engages the surface 19 of the plug 16, and then the separator member 38 was inserted so that its rib 51 engages the planosurface 44 of the separator member 37. Of course, it will be appreciated that the last inserted member may be used to move the first inserted member axially of the bore 11. The plug 17 is then threaded to position so that its planosurface 19 engages the rib 54 of the separator member 38, and all parts are thus held in predetermined relation. It will be noted that sealing members are disposed at both ends of the bore 11, so that such ends are sealed against leakage of fluid.

With my improved construction it is not essential to exactly follow the hereinbefore described mode of assembly. For example, the separator member 38 may first be assembled in the bore 11, so that its rib 51 engages the surface 19 of the plug 16, and the separator member 37 may then be moved to assembly with its planosurface 44 abutting the rib 54 of the separator member 38. This is permissible since all ribs 45, 51 and 54 are substantially of the same axial length, and since the spaces 40—48 and 42—49 would be in the same relative position with respect to the inlet and outlet openings in the body 10. Thus, it will be appreciated that the spaces 42 and 49 of the separator members cooperate with the plunger 21 to form axially-spaced valve ports at a predetermined location regardless of which one of the separator members is assembled first, and that each port is sealed from the other and each end of the bore is sealed.

In the construction shown in Figure 1, the apertures 33, 34 in the plunger 21 establish communication between opening 13 and exhaust openings 22. When the plunger 21 is moved to the left (Figure 1) apertures 34 will be moved out of communication with space 42 of member 37, to seal against exhaust, and apertures 35 of plunger 21 will communicate with space 42 of separator member 37 whereas apertures 36 will still communicate with space 49 of separator member 38, so as to establish communication between openings 12 and 13.

The valve shown in Figure 4 is of the double pilot-operated three way type, with sealed exhaust, that is, with connection to pipe off the exhaust. As herein shown, the valve body 61 is provided with an inlet opening 62, an outlet opening 63, and an exhaust opening 64. The bore 65, with the exception of being longer, is substantially similar to the bore 11 hereinbefore described, and is provided with enlarged threaded extremities providing shoulders as before. Plugs 66 and 67 are threaded into respective enlargements, and in this case separate bearing plates 68 are interposed between these plugs and the shoulders in the bore, so that pistons 69 secured to opposite ends of the plunger 70 may readily be accommodated. Each of the plugs 66, 67 has a threaded aperture 71 for attachment of a fluid operating line, as will be appreciated.

In the construction shown in Figure 4, three separator members are used, two being of the type shown in Figure 2, and designated by the reference numeral 37, and one being of the type shown in Figure 3, and designated by the reference numeral 38. As shown in this figure, the separator member 38 is interposed between the members 37, but as will be obvious from the preceding description, this relation is not essential, and the member 38 may be disposed at either end. In this type of valve, the opening in the plunger, and the apertures leading to such opening will be changed with respect to like parts in the valve shown in Figure 1, to accomplish the intended fluid control functions.

The valve shown in Figure 5 is of the four-way push-pull operated type. As herein shown, the body 75 is provided with an inlet opening 76, two outlet openings 77, and two exhaust openings 78. The bore 79 is similar to the bore 11 of valve shown in Figure 1, with the exception of being correspondingly longer. Plugs 17a, similar to the plugs 17 heretofore described, are used to close both ends of the bore. In this particular case, four separator members 37 and one separator member 38 are used, with the separator member 38 being located at the center position. However, here again, the exact disposition of the member 38 with respect to the members 37 is not of great importance, since if its disposition were changed from that shown, the ends of the valve bore would still be sealed and the valve would function as intended. The plunger 80 will operate as a balanced spool and will remain in any one of its positions. Of course, the plunger will be formed with openings and apertures, as shown, in order to perform the necessary valving action.

By using the same valve body 75 and separators 37, 38, as is shown in Figure 5, and merely changing the plunger openings and apertures, the valve shown in Figure 5 may be converted, as shown in Figure 6, to one having two fluid inlets 81 and 82 respectively communicable with two fluid outlets 83 and 84, with both outlets communicable with a common exhaust outlet 85.

Thus, it will be appreciated that by proper choice of valve body, plunger, and combination of separator members 37 and 38, a valve to suit any requirement may be made. Further, assembly time is considerably reduced since each separator member carries its own sealing means and the members may be assembled in more than one predetermined relation. Also, in the event any of the seals should wear after considerable usage, it is a simple matter to replace the seals or to replace the entire separator. Accordingly, the separator members may be accurately made in quantities and used in any type of valve in combinations as dictated by requirements.

A further advantage inherent in my invention is that the sealing means, such as the O ring packings herein shown, are held in operative relation without being subjected to stress applied by holding means. Also, the packings in valves made in accordance with my invention are so positioned that no load is transmitted from one packing to another by virtue of pressure existing in some remote chamber. As will be clear from this disclosure, the individual packings only carry the stress actually developed by pressure in their respective chambers.

From the foregoing, it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A valve assembly for use with any one of a number of valve bodies which have bores similar except for extent and have abutment means defining a fixed position along said bore and have varied number of spaced-apart fluid inlet and outlet openings in predetermined relation with respect to said abutment means, comprising a valve plunger movable axially of said bore, and a plurality of apertured sleeve-like insert members forming an opening through which said valve plunger works, said members being successively insertable from an end of the bore of a selected valve body and of a number to correspond to the inlet and outlet openings of said selected body, adjoining ones of said members being in rigid and direct interabutting engagement and the first inserted member rigidly and directly abutting said abutment means, and sealing means associated with said insert members for sealing against fluid passage along said plunger and the valve body bore, each of said insert members forming a valve chamber in part defined by said bore and partly defined by said plunger, said chambers being cooperable with the respective inlet and outlet openings of said selected valve body, said abutment means and insert members and fluid inlet and outlet openings being correlated so that said number of insert members may be inserted into the bore of said selected valve body to produce a valve of predetermined type.

2. A valve assembly for use with any one of a number of valve bodies which have bores similar except for extent and have abutment means defining a fixed position along said bore and have varied number of spaced-apart fluid inlet and outlet openings in predetermined relation with respect to said abutment means, comprising a valve plunger movable axially of said bore, and a plurality of apertured sleeve-like insert members forming an opening through which said valve plunger works, said members being successively insertable from an end of the bore of a selected valve body and of a number to correspond to the inlet and outlet openings of said selected body, adjoining ones of said members being in rigid and direct end-to-end interabutting engagement and one end of the first inserted member rigidly and directly abutting said abutment means, inner and outer sealing means carried by each of said members for respectively sealing against fluid passage along said plunger and along said valve body bore, each of said insert members forming a valve chamber in part defined by said bore and in part defined by said plunger, said chambers being cooperable with the respective inlet and outlet openings of said selected valve body, said abutment means and insert members and fluid inlet and outlet openings being correlated so that said number of insert members may be inserted into the bore of said selected valve body in various successive relations to produce a valve of predetermined type.

3. Valve means comprising a valve body having a bore and fluid inlet and outlet openings, a plurality of apertured sleeve-like axially-arranged insert members disposed in abutting end-to-end relation in said bore, certain of said insert members having an annular rib formed at each end and certain other of said insert members having an annular rib formed at one end and a plane surface formed at the other end adapted to be engaged by an annular rib of an adjoining insert member, a valve plunger movable axially through the opening formed by said insert members, and sealing means associated with said insert members for sealing against fluid passage along said plunger and along said bore.

4. Valve means comprising a valve body having a bore and fluid inlet and outlet openings, a plurality of apertured sleeve-like axially-arranged insert members disposed in abutting end-to-end relation in said bore, certain of said insert members having an annular rib formed at each end and providing inner and outer annular pockets at each end and certain other of said insert members having an annular rib formed at one end and providing inner and outer annular pockets at such end and having a plane surface formed at the other end adapted to be engaged by an annular rib of an adjoining insert member, a valve plunger movable axially through the opening formed by said insert members, and sealing means disposed in the inner and outer annular pockets of said insert members for sealing against fluid passage along said plunger and along said bore.

5. Valve means comprising a valve body having a bore and spaced fluid openings communicating therewith, a plurality of rigid sleeve-like insert members disposed in mechanically pressed abutting end-to-end relation longitudinally of said bore, a ported valve plunger movable through said insert members, adjoining insert members having abutting surfaces disposed normal to the longitudinal axis of said bore to rigidly position said members in said bore to absorb the mechanical holding pressure without exerting transverse thrust against the adjacent surfaces of said bore and said plunger, and a pair of concentric sealing rings for each insert member, the outer of said rings being disposed between said insert member and said valve body to seal against fluid passage along said bore, the inner of said rings being disposed between said insert member and said valve plunger to seal against fluid passage therebetween, said sealing rings being positioned free from pressure of the abutting surfaces of said adjoining insert members and thereby being free of any mechanical pressure maintaining said members in end-to-end relation, each of said insert members being apertured to provide for fluid flow from one valve body fluid opening through the ported valve plunger and thence to another fluid opening in said body.

6. Valve means comprising a valve body having a bore and spaced fluid openings, a plurality of rigid sleeve-like insert members disposed and mechanically pressed in aligned abutting end-to-end relation longitudinally of said bore, a ported valve plunger movable through said insert members, adjoining insert members having rigidly interabutting portions which firmly transmit mechanical pressure from one to the other, each of said insert members having recesses disposed on opposite sides of the portion thereof which abuts with an adjoining member, a pair of concentric sealing rings for each insert member, the outer ring being disposed between said insert member and said valve body to seal against fluid passage along said bore, the inner ring being disposed between said insert member and said valve plunger to seal against fluid passage therebetween, said sealing rings being positioned in respective recesses so as to be free from pressure of respective abutting portions of said adjoining insert members and thereby being free of any mechanical pressure maintaining said members in aligned end-to-end relation, each of said insert members being apertured to provide for fluid flow from one valve body fluid opening through the ported valve plunger and thence to another fluid opening in said body.

7. A valve structure as defined in claim 5 wherein each of said insert members include inner and outer chambers separated by an apertured wall and respectively opening to a related fluid opening and toward the ports of said valve plunger, and wherein said inner and outer chambers are respectively of greater longitudinal length than their related fluid opening and a related plunger port, whereby said insert members are operably related to said fluid openings and said plunger ports despite inaccuracies in respective construction.

SAMUEL C. CHESSMAN.

References Cited in the file of this patent

UNITED STATES PATENTS

| Number | Name | Date |
|---|---|---|
| 569,907 | Zinn | Oct. 20, 1896 |
| 767,732 | Bromley | Aug. 16, 1904 |
| 863,405 | Koelkebeck | Aug. 13, 1907 |
| 2,442,642 | Eckel | June 1, 1948 |
| 2,445,855 | Majneri | July 27, 1948 |
| 2,492,006 | Raybould | Dec. 20, 1949 |

FOREIGN PATENTS

| Number | Country | Date |
|---|---|---|
| 17,041 | Great Britain | of 1891 |